June 18, 1940.  E. A. LE BEAU  2,205,211

RAILWAY BRAKE GEAR STRUCTURE

Filed July 11, 1938  2 Sheets-Sheet 1

INVENTOR
ERNEST A. LE BEAU

BY Rodney Bedell
ATTORNEY

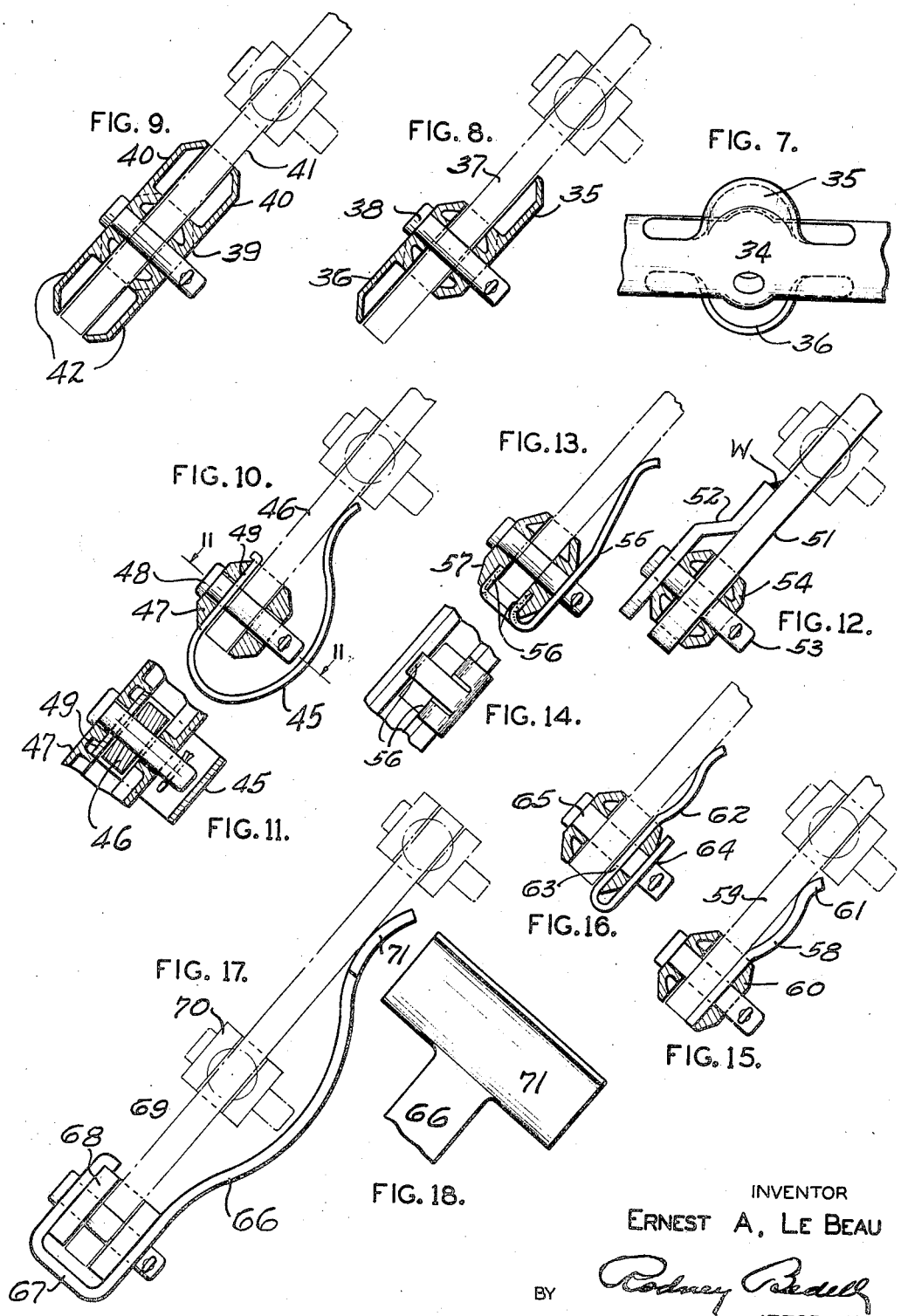

Patented June 18, 1940

2,205,211

UNITED STATES PATENT OFFICE 2,205,211

RAILWAY BRAKE GEAR STRUCTURE

Ernest A. Le Beau, Chicago, Ill., assignor to Chicago Railway Equipment Company, Chicago, Ill., a corporation of Illinois Application July 11, 1938, Serial No. 218,529

14 Claims. (Cl. 188—231)

The invention relates to railway brake gear and more particularly to a device, and associated parts, tending to maintain the angular relation between the brake lever and the brake beam fulcrum.

It is a common practice to support brake levers by their pivot pin connections to the brake beams and to incline the levers at an angle of forty degrees from the vertical, in which case gravity tends to pull the brake lever from its normal intended plane of operation, and this tendency is accented by the weight of connecting rods frequently carried by the upper portions of the lever. In many trucks, the live and dead lever rod passes through the truck bolster and is connected to the levers above the brake beam instead of being connected to portions of the levers projecting downwardly from the brake beam, and this arrangement further adds to the weight tending to twise the lever from its plane.

The tendencies referred to produce excessive wear upon the brake beam fulcrum pin and its bearings. Due to this wear, the railroads have considerable trouble with the parts mentioned, and where the lever connection passes through an aperture in the bolster the connection frequently bears against the edge of the aperture because the latter is kept as small as possible to avoid reducing the sectional area of the bolster.

The main object of the present invention is to avoid the departure of the brake lever from its intended angle and to reduce or eliminate the wear referred to, and this object is attained by providing the brake lever and fulcrum assembly with means affording support for the brake lever at a point spaced from the fulcrum pin.

While the invention may be embodied in numerous ways, selected arrangements are shown in the accompanying drawings, in which—

Figure 1 is a side elevation of a brake lever with portions of connecting rods secured thereto and also showing parts of the brake beam and other truck structure to which the brake gear is applied.

Figure 2 is an end elevation of the parts shown in figure 1, a portion of the brake beam fulcrum being sectioned. The figure is taken approximately on the line 2—2 of figure 1.

Figures 3, 4:
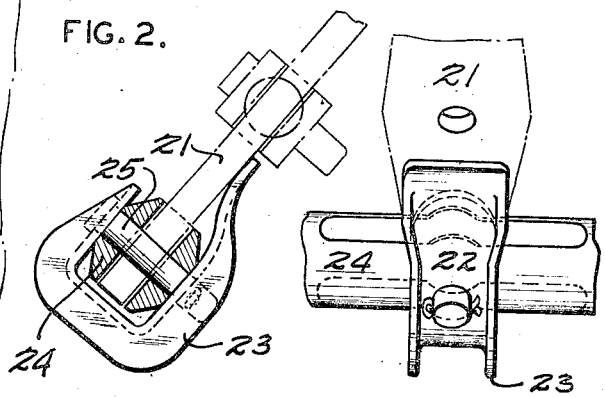
Figure 3 is a detail view corresponding to a portion of Figure 1 but illustrating another form of the invention.
Figure 4 is a detail view corresponding generally to Figure 2 but illustrating the form of invention shown in Figure 3.
Figure 6:
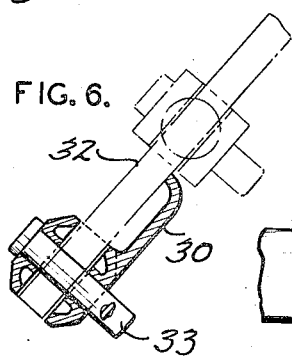
Figure 5:
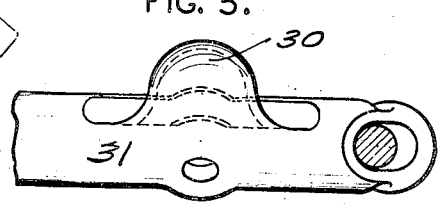

Figures 5 and 6 correspond to Figures 3 and 4 but illustrate another form of the invention.

Figures 7 and 8 similarly illustrate another form of the invention.

Figures 9, 10, 12, 13, 15, 16, and 17 correspond to Figures 2, 4, 6, and 8 but illustrate other forms of the invention.

Figure 11 is a transverse section taken on the line 11—11 of Figure 10.

Figure 14 is a view looking at the bottom of the structure shown in Figure 13.

Figure 18 is a detail view looking at the side of the structure shown in Figure 17.

Figure 1:
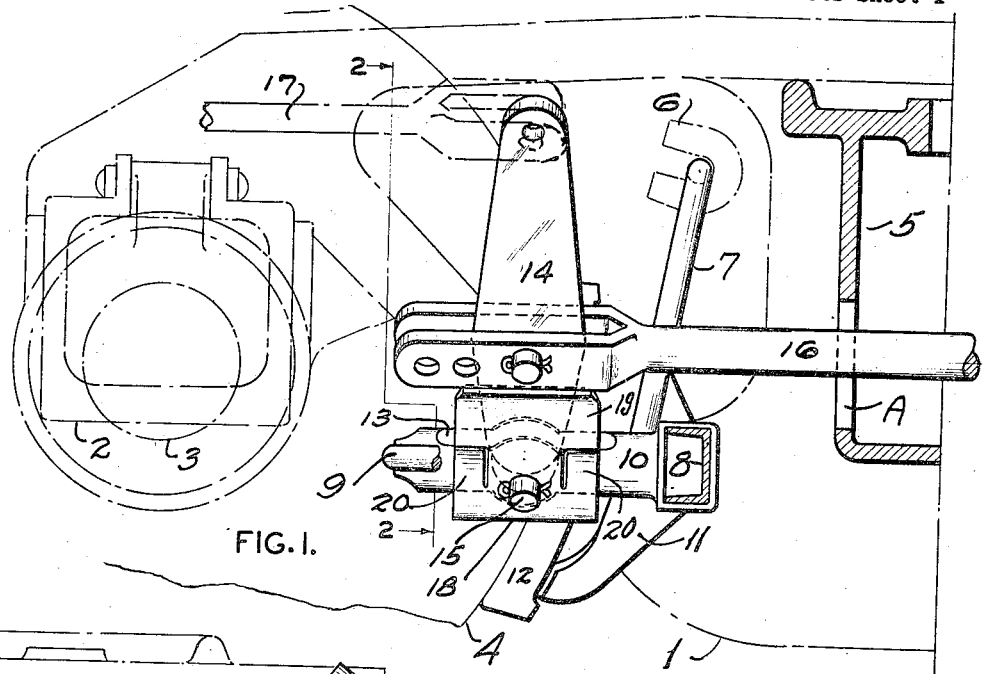
Figure 2:
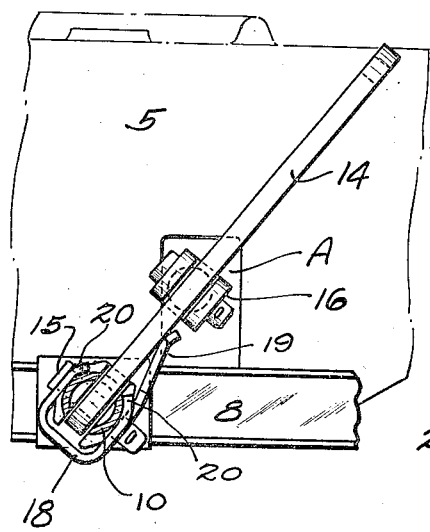

Figures 1 and 2 illustrate a four-wheel truck frame 1, including a journal box 2 mounted upon an axle 3 on wheel 4. The truck bolster is indicated at 5. Suspended from a bracket 6 on the truck frame is the usual hanger 7 for supporting the brake beam here shown as of typical truss type including a compression member 8, a tension member 9, a strut 10, heads 11, and shoes 12. The strut is recessed at 13 to receive the brake lever 14 pivotally secured to the strut by the fulcrum pin 15. A rod 16 passes through an aperture A in the bolster and connects lever 14 with the corresponding lever at the opposite side of the bolster, and a rod 17 connects lever 14 with a cylinder lever or a floating lever (not shown).

All of the above-mentioned parts are of usual construction (except fulcrum pin may be longer than usual as will appear below) and in themselves do not constitute the present invention.

A U-shaped strap 18 receives strut 10 and the lower end of lever 14 and has one leg extended upwardly at 19 and bearing against the underface of lever 14. Strap 18 is held in assembled relation with the associated parts by fulcrum pin 15. Ears 20 are stamped from the main portion of strap 18 and bent inwardly to engage strut 10 and relieve pin 15 of a portion of the weight of the strap and also grip the fulcrum and reduce or avoid rattling of the parts, and to prevent swiveling of the strap with the movement of the lever.

Strap 18 may be made of spring steel or open hearth steel and, in either case, presses transversely of the legs of the device against the under-face of the lever to support the latter, and the parts carried thereby, at a point spaced from the pivotal connection to the strut, thereby effecting the desired result previously referred to.

Figures 3 and 4 illustrate a similar structure in which the device for supporting lever 21 consists of a forging, stamping, or casting having a web 22, corresponding in outline to the body of strap 18, and provided with reinforcing flanges 23 which stiffen the device. Obviously this device is not intended to have yielding engagement with the lever. The device is assembled with the brake lever and fulcrum strut 24 by the pin 25, similar to the securing means previously described.

Figures 5 to 9 illustrate the invention embodied in extensions formed as integral parts of the fulcrum struts. In Figures 5 and 6, for example, the extension 30 projects upwardly from the body portion 31 of the strut to engage lever 32 at a point spaced a substantial distance above the fulcrum pin 33. The strut 34 shown in Figures 7 and 8 includes the upward extension 35 corresponding to that shown in Figures 5 and 6 but also includes a complementary downward extension 36 engaging the upper face of the lever 37 at a point below the fulcrum pin 38. To utilize this arrangement, it would be necessary to extend lever 37 downwardly from the strut. The strut 39 in Figure 9 duplicates the upper and downward extensions previously described, the upward extensions being shown at 40 on both sides of lever 41, and the downward extensions being shown at 42 also engaging both sides of the lever. All of the forms shown in Figures 5 to 9, inclusive, are indicated as being unyielding.

In each of these forms the elements surrounding the fulcrum pin and engaging one side thereof are in the same plane as the elements engaging that side of the lever and spaced from the fulcrum pin, whereby a plain bar lever is afforded substantial bearings on the strut over a wide area without any special contour being required for the side of the lever.

Figures 10 and 11 illustrate a modification in which the device 45 for supporting the lever 46 consists of a bar inserted in the space between one face of the lever and the opposing inner face of the lever-receiving jaw 47 of the strut and retained in place by the fulcrum pin 48 which, in this example, is no longer than the normal pin required for the strut and lever assembly. The strap 45 is indicated as of spring material, and it will be understood that the same may be inserted alongside of the upper face of the brake lever, as indicated in full lines at 49, or may be inserted alongside of the under face of the brake lever.

In Figure 12 the lever 51 and the support element 52 are welded to each other at W and, in effect, form a single unit having a jaw forming spaced bearings for engaging the fulcrum pin 53 seated in the strut 54.

Figures 13 and 14 illustrate a form of the invention in which the support member 55 has its lower ends 56 seated in recesses provided in strut 57 to replace the bearing faces ordinarily provided at this point by the strut. If desired, the ends 56 may be hardened to increase their useful life.

In Figure 15 the spring support 58 serves as a filler between the lever 59 and the lower side of strut 60, and the upper end 61 of the support 58 presses against the lower face of the lever.

Figure 16 shows a similar support member 62 with its lower end doubled to provide spaced bearings 63 and 64 between the support and the fulcrum pin 65.

In Figures 17 and 18, support member 66 resembles the form of the invention first described in having a U body section 67 receiving and being pinned to the strut 68 and the lower end of lever 69. The support device is elongated to extend upwardly above the connecting rod 70 and engage the lever at a point which will have a substantial range of movement. Hence the upper end 71 of the device is enlarged, as indicated in Figure 18, to provide support for the lever throughout its movement.

All forms of the invention embody the basic idea of supporting the lever in such manner as to avoid the application of heavy torsional or twisting forces to the lower end of the lever where it engages the strut and corresponding wear on the sides of the slot in the strut and on the fulcrum pin. Obviously other variations in the structure may be made by those skilled in the art without departing from the spirit of the invention, and the exclusive use of such modifications as come within the scope of the claims is contemplated.

I claim:

1. In combination, a railway brake beam strut having an aperture for a brake lever, a fulcrum pin extending through said strut, and means secured to said strut by said pin and extending transversely of said strut a substantial distance from said pin to engage a brake lever and resist its movement out of its normal operating plane.

2. In combination, a railway brake beam having a strut, a brake lever extending through said strut and inclined from the vertical, a fulcrum pin extending through said strut and lever, and a device secured to said strut and lever by said pin and supporting the lower side of said lever at a point spaced a substantial distance above said pin.

3. In combination, a railway brake beam strut, a lever extending therethrough, a fulcrum pin extending through said strut and lever, and a member held by said pin in assembled relation with said strut and extending from said strut alongside of said lever to engage the same and afford additional lateral support for said lever to avoid excessive wear on said pin and its bearings because of the tendency of said lever to tilt from its normal plane.

4. A combination as described in claim 3 in which the lever-engaging member is of spring material and yieldingly presses against the lever at a point spaced from the fulcrum pin.

5. In combination, a railway brake beam strut, a lever extending therethrough, a U-shaped member receiving said strut and the lower end of said lever between its legs, a pin extending through said lever, strut and member legs and holding them in assembled relation, at least one leg of said member extending a substantial distance above said pin and engaging the side of said lever and resisting play of said strut and lever angularly of the plane of said lever.

6. In combination, a railway brake beam strut having an aperture, a brake lever extending through said aperture, a fulcrum pin extending through said strut and lever, and a member having a part positioned between a face of said lever and an opposing face of said aperture and extending longitudinally of said lever a substantial distance beyond said strut and there supporting said lever against angular movement from the plane of its normal position in said strut.

7. In combination, a railway brake beam strut having an aperture, a brake lever extending through said aperture, a member having a part positioned between a face of said lever and an opposing face of said aperture and extending longitudinally of said lever a substantial distance beyond said strut and there supporting said lever against angular movement from the plane of its normal position in said strut, and a fulcrum pin extending through said strut, lever and member and holding them in assembled relation.

8. In combination, a railway brake beam strut, a brake lever extending through said strut, a fulcrum pin extending through said strut and lever, a connecting rod pivoted to said lever at a point spaced from said fulcrum pin, and a member secured to said strut and extending therefrom longitudinally of said lever and engaging the side of the latter at a point spaced farther from said strut than said connecting rod to resist movement of said lever from the plane of its normal position as determined by said strut and pin.

9. In combination, a railway brake beam strut, a brake lever extending through said strut, a fulcrum pin extending through said strut and lever, a connecting rod pivoted to said lever at a point spaced from said fulcrum pin, and a member having a U-shaped lower end receiving said strut and the corresponding end of said lever and held in assembled relation therewith by said pin and extending longitudinally of said lever past said connecting rod and terminating in a widened portion arranged to press against the side of said lever and resist movement of the latter from the plane of its normal position and relative to said strut and pin.

10. As a new article of manufacture, a device for application to a railway brake beam strut and lever, comprising a part arranged to engage a portion of the strut and apertured to receive and be held in position thereon by the fulcrum pin, and a projection extending from said part and arranged to engage the side of the lever to resist movement of the lever from the plane of its normal position relative to the strut.

11. As a new article of manufacture, a device having a general U-shape with its closed end arranged to receive and engage at least a portion of a brake beam strut and with its legs apertured to receive the strut and the fulcrum pin extending therethrough, and with at least one of its legs extending a substantial distance above the pin aperture to engage the side of a lever assembled with the strut to resist movement of the lever out of the plane of its normal position relative to the strut.

12. An article of manufacture as described in claim 11 in which the lever engaging extension at least is constructed to yield transversely of the legs.

13. An article of manufacture as described in claim 11 which consists of a channel-shaped bar with its web disposed to engage the strut and the lever and with its flanges disposed to form a rigid structure throughout the length of the device.

14. In combination, a railway brake beam strut including spaced jaws with transverse apertures, a brake lever comprising a flat bar fitting between said jaws and having a side lying in a single plane, a pivot pin extending through said bar and apertures, at least one of said jaws having a circular bearing for said lever side and surrounding said pin, and an element on said strut extending longitudinally of said lever from said pin and engaging said lever side at a point spaced substantially from said bearing to resist inclination of said lever from the normal position determined by said pin and bearings.

ERNEST A. LE BEAU.